US006748322B1

(12) United States Patent
Fernandez

(10) Patent No.: US 6,748,322 B1
(45) Date of Patent: Jun. 8, 2004

(54) SPEED MONITORING DEVICE FOR MOTOR VEHICLES

(75) Inventor: Jorge L. Fernandez, Miami Beach, FL (US)

(73) Assignee: Gem Positiong System, Inc., Miami, FL (US)

(*) Notice: Subject to any disclaimer, the term of this patent is extended or adjusted under 35 U.S.C. 154(b) by 307 days.

(21) Appl. No.: 09/760,403

(22) Filed: Jan. 12, 2001

(51) Int. Cl.[7] .................................... G06F 19/00

(52) U.S. Cl. .................... 701/213; 701/35; 340/426.19; 340/438

(58) Field of Search ............................ 701/1, 70, 213, 701/35; 307/10.2; 340/426, 933, 936, 438, 436, 426.1, 426.13, 426.14, 426.19

(56) References Cited

U.S. PATENT DOCUMENTS 5,515,042 A * 5/1996 Nelson ...................... 340/936
5,570,087 A * 10/1996 Lemelson .................. 340/936
5,952,941 A * 9/1999 Mardirossian ............. 340/936
5,977,884 A * 11/1999 Ross .......................... 340/936
6,012,013 A 1/2000 McBurney .................. 701/207
6,073,062 A * 6/2000 Hoshino et al. ............ 340/438
6,225,890 B1 * 5/2001 Murphy ...................... 340/426
6,232,874 B1 * 5/2001 Murphy ...................... 340/426
6,253,129 B1 * 6/2001 Jenkins et al. ............. 340/438
6,265,989 B1 * 7/2001 Taylor ........................ 340/936
6,266,617 B1 * 7/2001 Evans ........................ 340/436

* cited by examiner

*Primary Examiner*—Gary Chin
(74) *Attorney, Agent, or Firm*—J. Sanchelima; A. Bordas

(57) ABSTRACT

A system for monitoring the speed and location of a vehicle over a given area by using a global positioning system and comparing the position fix and speed against a computerized map for the area containing predetermined limits for the speed and territory over predetermined times and days of the week. If a limit is exceeded the position fix and speed information is stored along with the time when it took place. The stored information can be optionally transmitted to a remote location for further processing. Also, alarm circuits are provided inside the vehicle to selectively alert the occupants that a limit has been exceeded.

4 Claims, 1 Drawing Sheet

SPEED MONITORING DEVICE FOR MOTOR VEHICLES

BACKGROUND OF THE INVENTION

1. Field of the Invention

The present invention relates to a speed monitoring system for motor vehicles, and more particularly, to such a system that cross-references the position and speed of a vehicle with mapping software for a predetermined area where the vehicle is traveling.

2. Description of the Related Art

Many designs for vehicle position reporting systems have been designed in the past. None of them, however, include the features of the claimed invention, in particular the cross-referencing of the position and speed with predetermined characteristics or conditions associated with the area where the vehicle is located in order to alert the user whether predetermined conditions have been reached or exceeded.

The present invention uses mapping software to mark or delineate predetermined areas with an area overlay software. One of these mapping software programs is Street and Trips published by Microsoft Corp. These marked areas are coded with different parameters, i.e. speed, time, day of the week, etc., for the different streets and highways. A user or subscriber to the system, programs it using a friendly user interface to his/her needs. If the preset parameters or alarms are exceeded, a signal is generated that could selectively activate an alarm signal inside or transmitted outside the vehicle for further processing.

For instance, if a vehicle is traveling in a school zone its speed is expected to be below a predetermined limit. If the vehicle is traveling at a certain time of the day in a certain direction, it is expected to go slow and thus a delay is justified. It can be readily seen that the applications for the present invention are numerous. A parent can be notified via a built-in recorder, or live through a transmitter inside the vehicle when his/her teenager son/daughter has exceeded the speed limit in a given area or zone beyond certain territorial limits. Or a fleet manager can monitor the driving habits of the drivers he/she is responsible for.

Applicant believes that the closest reference corresponds to U.S. Pat. No. 6,012,013 issued to McBurney on Jan, 4, 2000 for Vehicle Position Reporting in User Defined Uni-Dimensional Coordinate System. The patented system provides position information of a vehicle, like the present invention. However, it differs from the present invention because it does not include a cross-reference to the area where the vehicle is traveling to trigger alarms or other signals.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system for alerting a user as to whether a vehicle utilizing the present invention is used outside a set of predetermined conditions or limits with reference to the geographical area where the vehicle is traveling.

It is another object of the present invention to provide a system that records the time and date when a driver violated one or more of the predetermined conditions.

It is another object of this invention to provide a system that transmits the driver's violations to a remote unit.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
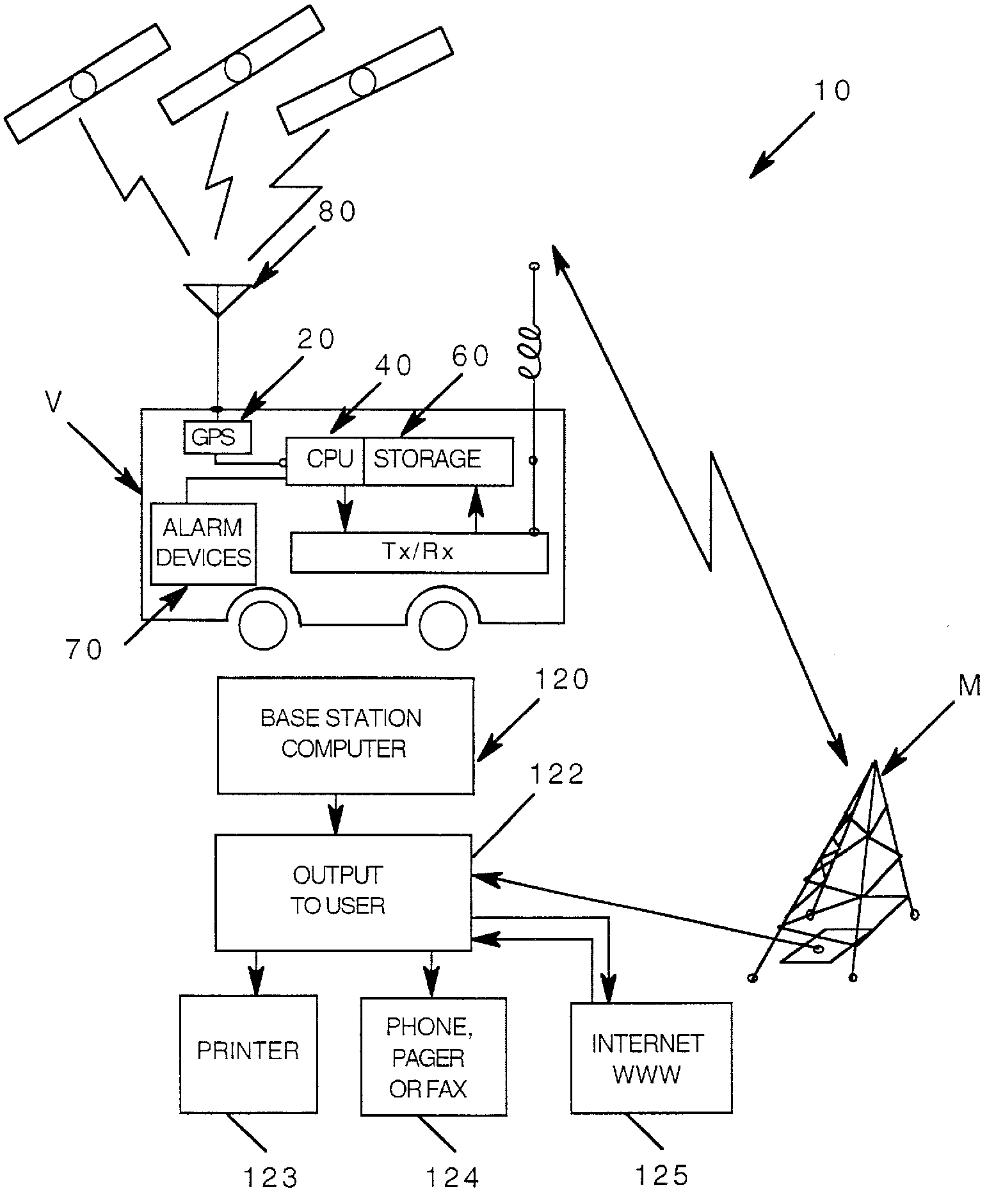
FIG. 1 represents a diagram of the speed monitoring system for motor vehicles showing the different assemblies.

Referring now to the drawings, where the present invention is generally referred to with numeral 10, it can be observed that it basically includes global positioning system (GPS) 20 installed in vehicle V and connected to computerized unit 40 with associated memory or storage circuit 60 for the storage of instructions and data. These instructions and data include a mapping software program modified to accept the position fix and speed information supplied by GPS 20 and compare it with predetermined speed limits for certain geographical areas through an overlay software that includes a user friendly interface. If these limits are exceeded, an output is generated and stored in memory circuit 60 for subsequent generation, transmission and analysis of an output signal. Optionally, an alarm 70 can be activated inside vehicle V upon violation of one or more of the predetermined parameters. The dates and times when these limits are exceeded are recorded as well as the position fix and the speed. The mapped limits are associated with maximum speed limits and territories. These limits can be made to change depending on the time of the day or night as well as the day of the week, season or year.

A user can thus program computerized unit 40 to have certain parameters for a given area (that could be a highway) and the parameters apply only during certain hours of the day. For instance, the area including a highway could have 100 km/hr as the maximum speed limit during daytime and dropped to 80 km/hr at night and on weekdays. If any of these conditions are violated, system 10 could be selectively programmed to activate an alarm 70 inside vehicle V to alert the driver. Or, system 10 can be programmed to send a signal through transceiver assembly 80 to a remote computerized station 120 for further processing including the generation of an output signal or message 122 that can be transmitted through a global computer network 125 (such as the internet), public telephone network 124 (as a pre-programmed telephone message, pager, fax, etc.), printed or displayed output 123 or any other output form.

The signal is transmitted using transceiver assembly 80 which can be implemented using cellular telephone technology to transmit the signal to a modem M that can in turn, optionally, be connected to a computerized station for further processing of the signal. Alternatively, or in parallel, transceiver assembly 80 can send a preprogrammed telephonic message to the user. Depending on the level of attention to be devoted to the monitoring activities, a user may be more or less actively involved (real time), or merely allow the system to develop a historical trail of the violations.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for monitoring the speed and location of a vehicle over a given area, comprising:

A) global positioning means for providing the position fix and speed information of a vehicle; and B) computerized means for receiving position fix and speed data and further including storage means for storing data and software;

C) software means for mapping a predetermined area including overlay software means for coding portions of said area and said coded portions including predetermined vehicle speed limits over at least two time and date periods;

D) means for comparing said position fix and speed data with said coded portions to determine violations;

E) means for generating an output signal upon the occurrence of at least one of said violations; and F) means for codifying said output signal in accordance with a user's desire or level of attention and further including means for transmitting said codified signal to a remote user's receiver as an alarm.

2. The system set forth in claim 1 wherein said receiver includes a remote computer assembly including means for receiving said position fix and speed data that caused the generation of said output signal.

3. The system set forth in claim 2 further including alarm means installed within said vehicle for selectively alerting the occupants that at least one of said violations has occurred.

4. The system set forth in claim 3 wherein said remote computer assembly is selectively programmed to activate said alarm means.

* * * * *